United States Patent [19]

Takehara et al.

[11] Patent Number: 4,564,082
[45] Date of Patent: Jan. 14, 1986

[54] STRUCTURE FOR SUPPORTING A POWER UNIT FOR A VEHICLE

[75] Inventors: Shin Takehara, Zama; Toshiyuki Tabata, Sagamihara, both of Japan

[73] Assignee: Nissan Motor Co., Ltd., Yokohama, Japan

[21] Appl. No.: 528,151

[22] Filed: Aug. 31, 1983

[30] Foreign Application Priority Data

Sep. 1, 1982 [JP] Japan .................................. 57-152130

[51] Int. Cl.$^4$ .............................................. B60K 5/12
[52] U.S. Cl. .................................... 180/312; 180/291
[58] Field of Search .............. 180/312, 291, 232, 297; 248/554, 352

[56] References Cited

U.S. PATENT DOCUMENTS 1,606,966 11/1926 Clarke .................................. 180/312
3,517,765 6/1970 Wessells et al. .................... 180/312
4,449,603 5/1984 Langwieder et al. ............... 180/312

FOREIGN PATENT DOCUMENTS 56-124526 2/1980 Japan .

Primary Examiner—Richard A. Bertsch
Attorney, Agent, or Firm—Schwartz, Jeffery, Schwaab, Mack, Blumenthal & Evans

[57] ABSTRACT

A structure for supporting a power unit for a vehicle wherein the power unit comprises an engine proper and a transmission housing. The transmission housing is connected with the engine proper in a direction transversely of the vehicle body. The engine proper is supported on one of two longitudinally extending side members on or near a principal axis of inertia of the power unit and the transmission housing is supported on the other of the side members at two points in opposed relation to each other with respect to the axis.

12 Claims, 4 Drawing Figures

STRUCTURE FOR SUPPORTING A POWER UNIT FOR A VEHICLE

BACKGROUND OF THE INVENTION

This invention relates to a structure for supporting a power unit for a vehicle in which a transmission is connected with a transversely disposed engine proper in a direction transversely of the body of a vehicle.

In general, front-engine and front-drive type vehicles are designed such that an engine proper is disposed transversely of the body of a vehicle so as to reduce the fore-and-aft dimension of an engine room thereby to enlarge the space inside a passenger room. In such front-engine and front-drive type vehicles, a transmission housing enclosing a transmission gear train is connected with the engine proper through a clutch housing having a clutch received therein, and a differential gear housing with a differential gear therein is formed integrally with the transmission housing. Thus, the engine proper, the clutch, the transmission and the differential gear jointly constitute a power unit. There are a number of power units of this type in which a transmission housing is disposed on one side of a engine proper transversely of the body of a vehicle.

In this connection, there has been known a structure for supporting such a power unit on the vehicle body, as shown in FIG. 1 or FIG. 2, wherein reference numeral 1 designates a power unit; 2 an engine; 3 a clutch housing; 4 a transmission housing; and 5 a differential gear housing and an arrow X shows a forward direction of the vehicle. The power unit 1 is disposed in an engine room of a vehicle.

It is well known that the power unit 1 is caused under the engine operation to vibrate in a rolling manner around a predetermined straight line L passing through the center of gravity G thereof, the line L being called a principal axis of inertia. In general, the principal axis of inertia L extends diagonally or obliquely from the front end of the power unit 1 at the side of the engine proper 2 toward the rear end of the power unit 1 at the side of the transmission housing 4.

The structure for supporting the power unit 1, as illustrated in FIG. 1, is of a three-point support type having three support means 6a, 6b and 6c each comprising a rubber A, a bracket B attached to the power unit 1, and a bracket C attached to the vehicle body. One 6a of the support means is disposed on the principal axis of inertia L at the front end of the power unit 1 at the side of the engine proper 2 so as to support the engine proper 2 on a longitudinally extending side member 7a of the vehicle body; another support means 6b is disposed at the front end of the power unit 1 at the side of the transmission housing 4 in opposed relation to the support means 6a so as support the transmission housing 4 on another longitudinally extending side member 7b of the vehicle body; and the remaining support means 6c is disposed at the right side of the rear portion of the differential gear housing 5 so as to support the gear housing 5 on a dash board panel 8.

Incidentally, in FIG. 1, a restricting means 9 such as a buffer rod serves to restrict the rolling displacements of the power unit 1, but does not have any function of supporting the static load of the power unit 1.

With such a conventional power unit supporting structure of the three-point support type as described above, however, the support means 6b at the side of the transmission housing 4 and the support means 6c at the side of the differential gear housing 5 are away from the principal axis of inertia L so that they are caused to displace greatly during rolling displacements of the power unit 1. Accordingly, to reduce the rigidity against rolling of the support means 6b, 6c, it is necessary to decrease the spring constant or modulus of elasticity of the rubber A of each of these support means, but such a measure results in a remarkably reduced durability of the rubber A. In addition, since the support means 6c supporting the power unit 1 at side of the differential gear housing 5 is attached to the dash board panel 8 having a relatively low rigidity, as described before, there arises a problem in that vibrations of the power unit 1 is transmitted from the dash board panel 8 through the support means 6c to the interior of the passenger room, thus generating confined noises therein.

The above-described various problems are cleared by employing a two-point support type structure for supporting the power unit, as disclosed in the Japanese utility model application laid open to public inspection under Ser. No. 56-124526. Specifically, as shown in FIG. 2, there are provided two support means 10a, 10b, of which one 10a is disposed on or near the principal axis of inertia L at the front end of the power unit 1 at the side of the engine proper 2, whereas the other support means 10b is disposed on or near the principal axis of inertia L at the rear end of the power unit 1 at the side of the transmission housing 4. As a result, the respective support means 10a, 10b are disposed close to the principal axis of inertia L so that the amount of displacement of the power unit 1 acting on the support means 10a, 10b is reduced to substantial extent. Therefore, it is possible to improve the durability of the rubbers A of the support means 10a, 10b by increasing the spring constant or the modulus of elasticity thereof. Further, the support means 10a, 10b are attached to the opposed side members 7a, 7b, respectively, of the vehicle body so that noises confined in the passenger room can be reduced to a practical extent.

The above power unit support structure as illustrated in FIG. 2, however, involves another disadvantage in that accurate positioning of the power unit 1 is difficult and hence the position of the power unit 1 as installed would be displaced from its intended position, thus making it impossible to arrange the power unit 1 in proper and exact alignment with its associated parts or elements, because of two-point support structure. Moreover, such an improper positioning of the power unit 1 as displaced from its intended position causes a control rod (not shown) operatively connecting the gear train inside the transmission housing 4 with a shift lever (not shown) to be pulled to develop a so-called falling-off of the gears in the transmission housing 4.

SUMMARY OF THE INVENTION

In view of the above, it is an object of the present invention to provide a novel and improved structure for supporting a power unit for a vehicle of the kind described which is capable of reclucing noises confined in a passenger room to a substantial extent.

Another object of the present invention is to provide a novel and improved structure for supporting a power unit for a vehicle of the kind described which has excellent durability.

To achieve the above objects, according to the present invention, it is proposed that a power unit be supported at the side of an engine proper on a longitudinally extending side member on or near a principal axis of inertia of the power unit at one point, and at the side of a transmission housing on another longitudinally extending side member at two points in opposed relation to each other with respect to the principal axis of inertia.

The above and other objects, features and advantages of the present invention will be apparent from the following detailed description of a preferred embodiment of the invention when taken in conjunction with the accompanying drawings.

DESCRIPTION OF THE PREFERRED EMBODIMENT

Figure 1:
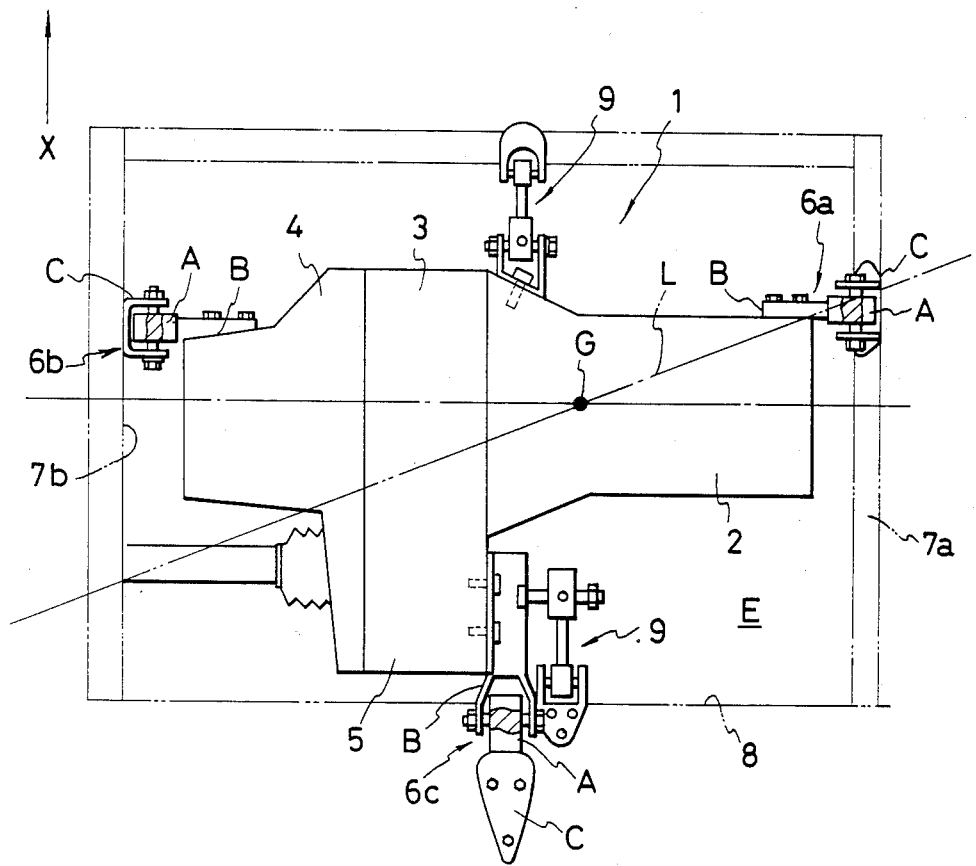
FIG. 1 is a plan view of a conventional power unit supporting structure.
Figure 2:
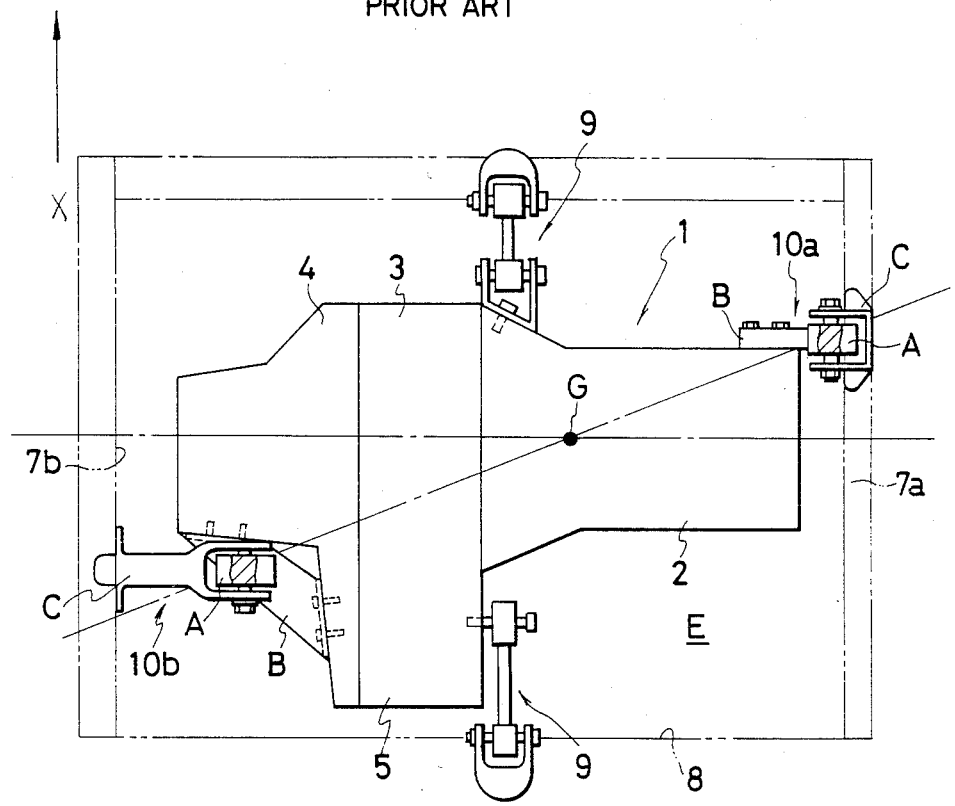
FIG. 2 is a plan view of another type of conventional power unit supporting structure.

Now, description is made of a preferred embodiment of the present invention with reference to the accompanying drawings, in which the same parts thereof as those of the conventional power unit supporting structure as illustrated in FIG. 1 or 2 are identified with the same references as those employed in the latter.

Figure 3:
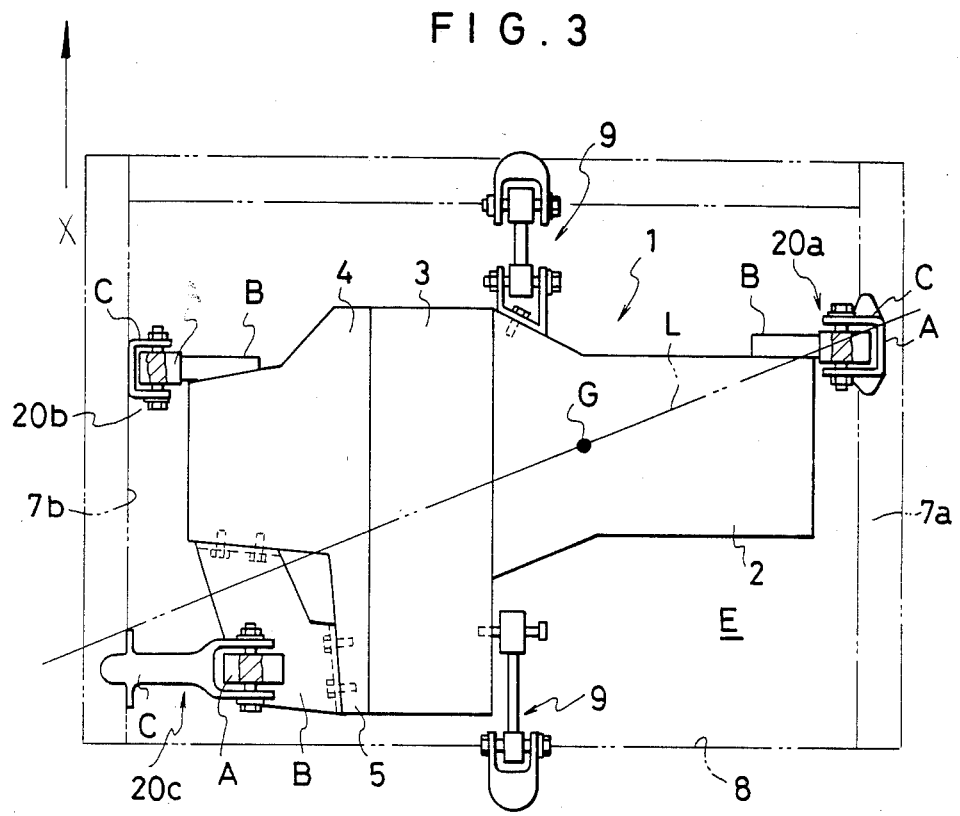
FIG. 3 is a plan view of a power unit supporting structure according to the present invention.
Figure 4:
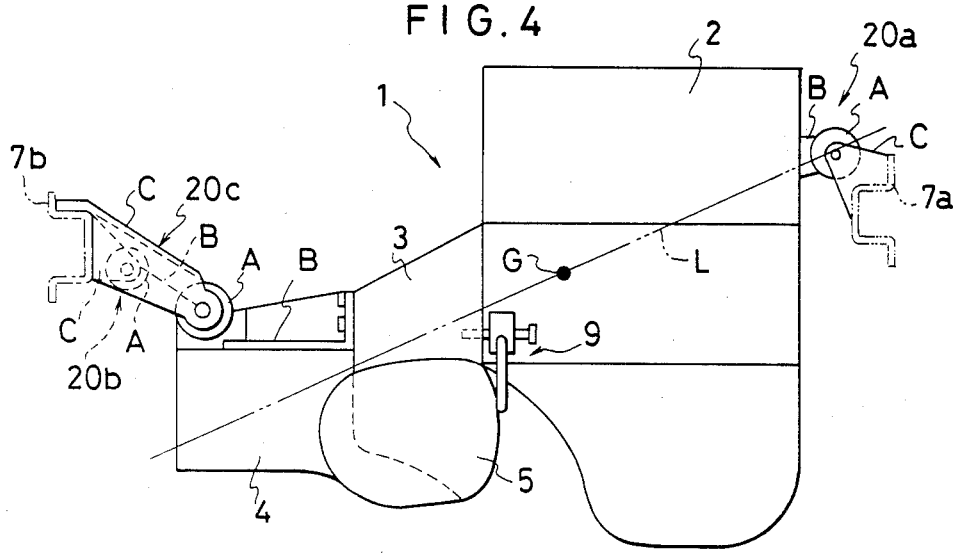
FIG. 4 is a front elevation of the power unit supporting structure as shown in FIG. 3.

FIGS. 3 and 4 illustrate a preferred embodiment of a power unit supporting structure according to the present invention, in which a power unit 1 comprises an engine proper 2 disposed transversely of the body of a vehicle, and a transmission housing 4 connected to one transverse side of the engine proper 2 through the intermediary of a clutch housing 3, similarly to the conventional power unit supporting structure as shown in FIG. 1 or 2. The connecting portion between the clutch housing 3 and the transmission housing 4 is extended at the rear end thereof so as to form a differential gear housing 5. Reference character L denotes a principal axis of inertia passing through the center of gravity G of the power unit 1.

In this connection, it is to be noted that according to the present invention, for the purpose of supporting the power unit 1 on the body of a vehicle, there are employed three support means 20a, 20b and 20c each comprising a rubber A, a bracket B fixedly secured to the power unit 1, and a bracket C fixely secured to the vehicle body. One 20a of these support means is disposed on the principal axis of inertia L at the front end of the power unit 1 at the side of the engine proper 2 so as to support the engine proper 2 on one 7a of the longitudinally extending side members of the vehicle body, whereas another support means 20b is disposed on the front end of the power unit 1 at the side of the transmission housing 4 so as to support the housing 4 on the other longitudinally extending side member 7b. The remaining support member 20c is disposed at the rear end of the power unit 1 at the side of the transmission housing 4 in opposed relation to the support means 20b with respect to the principal axis of inertia L so as to support the housing 4 on the other side member 7b. Incidentally, a buffer rod 9 serves as a displacement restricting means.

With the above construction, the power unit 1 is supported on the vehicle body at three points in total, namely at one point on a principal axis of inertia L at the engine-proper side, and at two points at the side of the transmission housing 4 in opposed relation to each other with respect to the principal axis of inertia L, as a consequence of which accurate positioning of the power unit 1 can be effected in an easy manner thereby to enable the alignment of the power unit 1 to be set at a predetermined position without fail. Therefore, even during rolling vibrations of the power unit 1, the distance between the shift lever (not shown) and the transmission housing 4 remains within a predetermined range, thus positively preventing the falling-off of the gears inside the transmission housing 4.

In addition, due to the two-point support of the power unit 1 at the side of the transmission housing 4, there is omitted a support means 6c which is provided between the differential gear housing 5 and the dash board panel 8 in the prior art three-point support structure as illustrated in FIG. 2, and in place thereof, a support means 20c is provided at the side of the transmission housing 4 so that it is disposed closer to the principal axis of inertia L than the prior art support means 6c on the side of the differential gear housing 5. In other words, such a disposition of the support means 20c close to the principal axis of inertia L serves to reduce the amount of displacement of the power unit 1 at the support means 20c during its rolling vibrations so that the spring constant or the modulus of elasticity of the rubber A of the support means 20c can be increased to improve the durability of the rubber A and hence the support means 20c.

Further, the support means 20c, 20b and 20c supporting the power unit 1 on the vehicle body are fixedly attached to the respective side members 7a, 7b but not to the dash board panel 8 unlike the prior art three-point support structure as shown in FIG. 1, whereby vibrations to be transmitted from the power unit 1 to the interior of the passenger room are substantially restrained to reduce noises confined in the passenger room to a material extent.

From the foregoing description, it will be appreciated that in the power unit supporting structure of the present invention, the power unit is supported at the side of the engine proper on one of the longitudinally extending side members through the intermediary of a support means having a damping rubber on or near the principal axis of inertia of the power unit, as in the prior art power unit supporting structure, so that the spring constant or the modulus of elasticity of the rubber of the support means can be increased to improve the durability thereof. On the other hand, the power unit is also supported, in addition to the one-point support at the side of the engine proper, at the side of the transmission housing on the other side member at two points in opposed relation to each other with respect to the principal axis of inertia so that it is eventually supported at three points in total, thus enabling the power unit to be positioned with a ready and easy manner so as to set the alignment of the power unit at a predetermined position without fail. As a result, the gears in the transmission housing can be prevented from falling off during rolling vibrations of the power unit. Moreover, due to the two-point support of the power unit at the side of the transmission housing, at least one of two support means of the present invention for supporting the power unit at the side of the transmission housing is disposed closer to the principal axis of inertia as compared with the three-point support structure of the prior art so that the spring constant or the modulus of elasticity of the rubber of the at least one support means can be increased to improve the durability thereof. In addition, the two portions of the power unit at the side of the transmission housing are supported on one of the side members, and no portion thereof is supported on the dash board panel unlike the prior art three-point support structure, it is possible to reduce noises confined in the passenger room of a vehicle to a substantial extent.

What is claimed is:

1. A structure for supporting a power unit for a vehicle of front-engine and front-drive type wherein said power unit comprises an engine proper disposed transversely of the vehicle body, and a transmission housing having a transmission gear train received therein, said transmission housing connected with said engine proper in a direction which is transverse of the vehicle body, said structure comprising:

first supporting means provided on the engine proper side of said power unit on the principal axis of inertia of said power unit and which supports said power unit on a first longitudinal side member; and second and third supporting means provided on the transmission side of said power unit at two positions in opposed relation to each other respective to the principal axis on a second longitudinal side member.

2. A structure claimed in claim 1, wherein said transmission housing is connected to said engine proper through a clutch housing.

3. A structure claimed in claim 1, wherein, said power unit is connected to at least one restricting means which serves to restrict the rolling displacement of said power unit.

4. A structure claimed in claim 3, wherein, said restricting means are buffer rods.

5. A structure claimed in claim 1, wherein said second or third supporting means is secured to said power unit through an auxiliary bracket.

6. A structure claimed in claim 1, wherein said third supporting means is secured to said power unit through an auxiliary bracket.

7. A structure for supporting a power unit for a vehicle of front-engine and front-drive type wherein said power unit comprises an engine proper disposed transversely of the vehicle body, and a transmission housing having a transmission gear train received therein, said transmission housing connected with said engine proper in a direction which is transverse of the vehicle body, said structure comprising:

first supporting means provided on the engine proper side of said power unit adjacent in the principal axis of inertia of said power unit and which supports said power unit on a first longitudinal side member; and second and third supporting means provided on the transmission side of said power unit at two positions in opposed relation to each other respective to the principal axis on a second longitudinal side member.

8. A structure claimed in claim 7, wherein said transmission housing is connected to said engine proper through a clutch housing.

9. A structure claimed in claim 7, wherein said power unit is connected to at least one restricting means which serves to restrict the rolling displacement of said power unit.

10. A structure claimed in claim 9, wherein said restricting means are buffer rods.

11. A structure claimed in claim 7, wherein said second supporting means is secured to said power unit through an auxiliary bracket.

12. A structure claimed in claim 7, wherein said third supporting means is secured to said power unit through an auxiliary bracket.

* * * * *